E. R. SLOAN.
CONVERTIBLE MOTOR AND PUMP.
APPLICATION FILED JAN. 13, 1913.
1,085,761.
Patented Feb. 3, 1914.
4 SHEETS—SHEET 2.
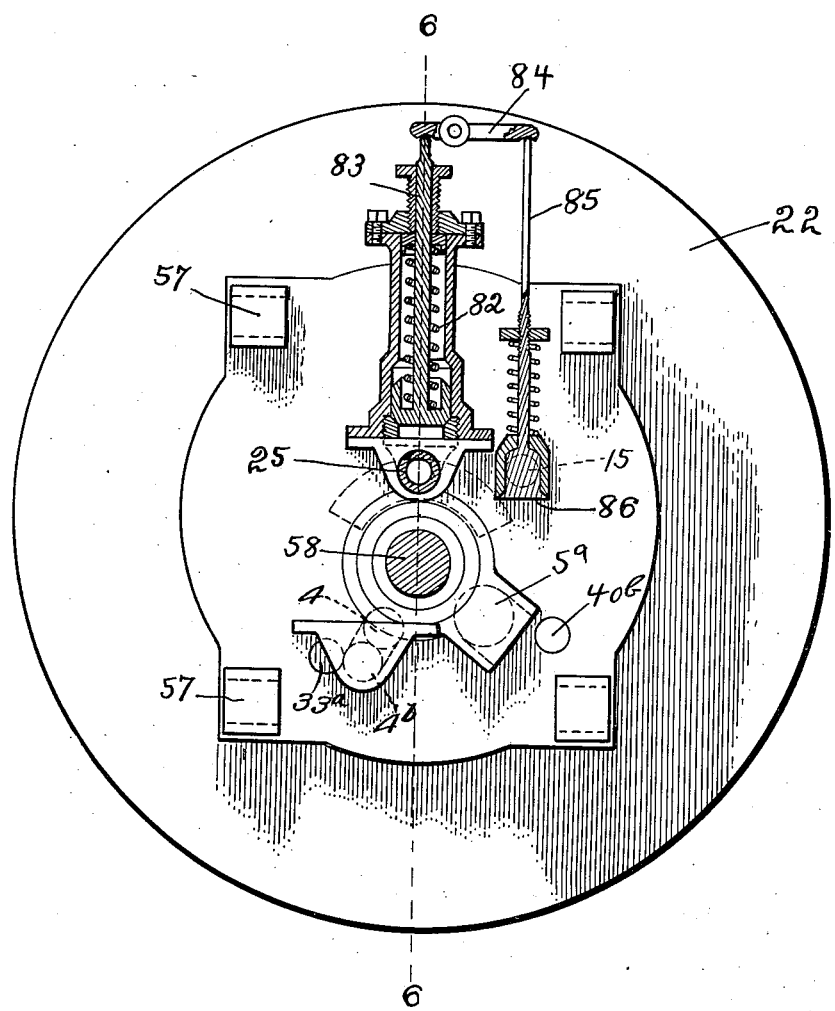

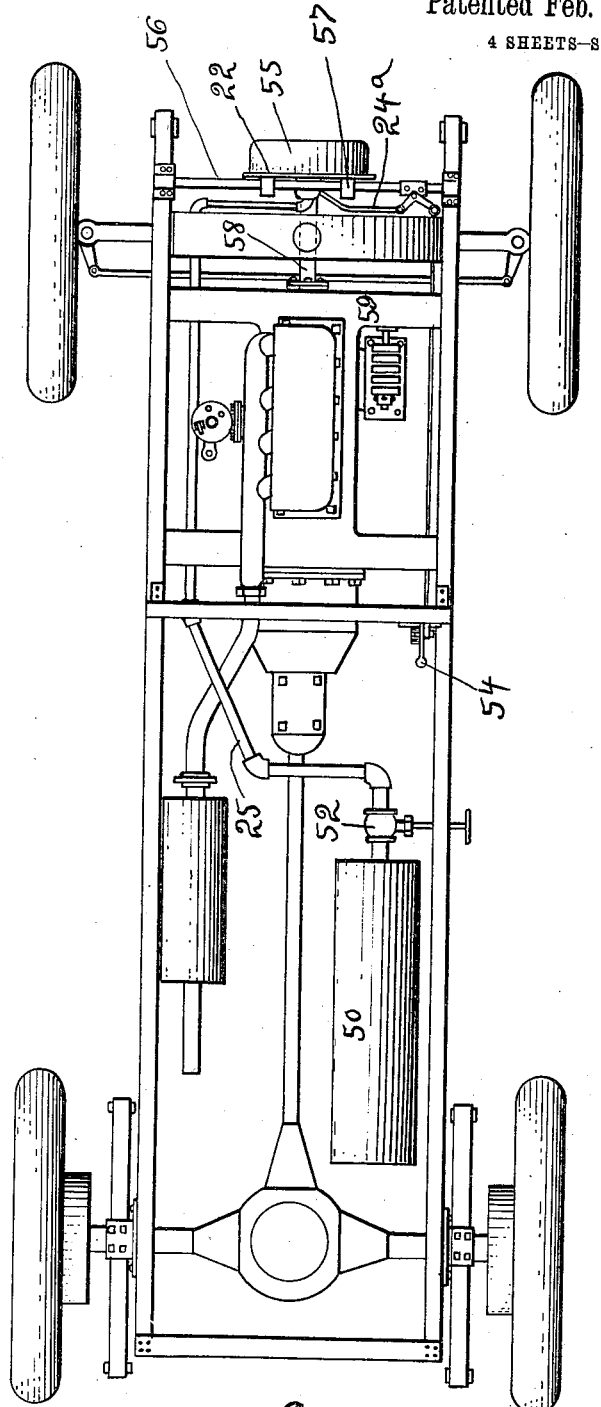

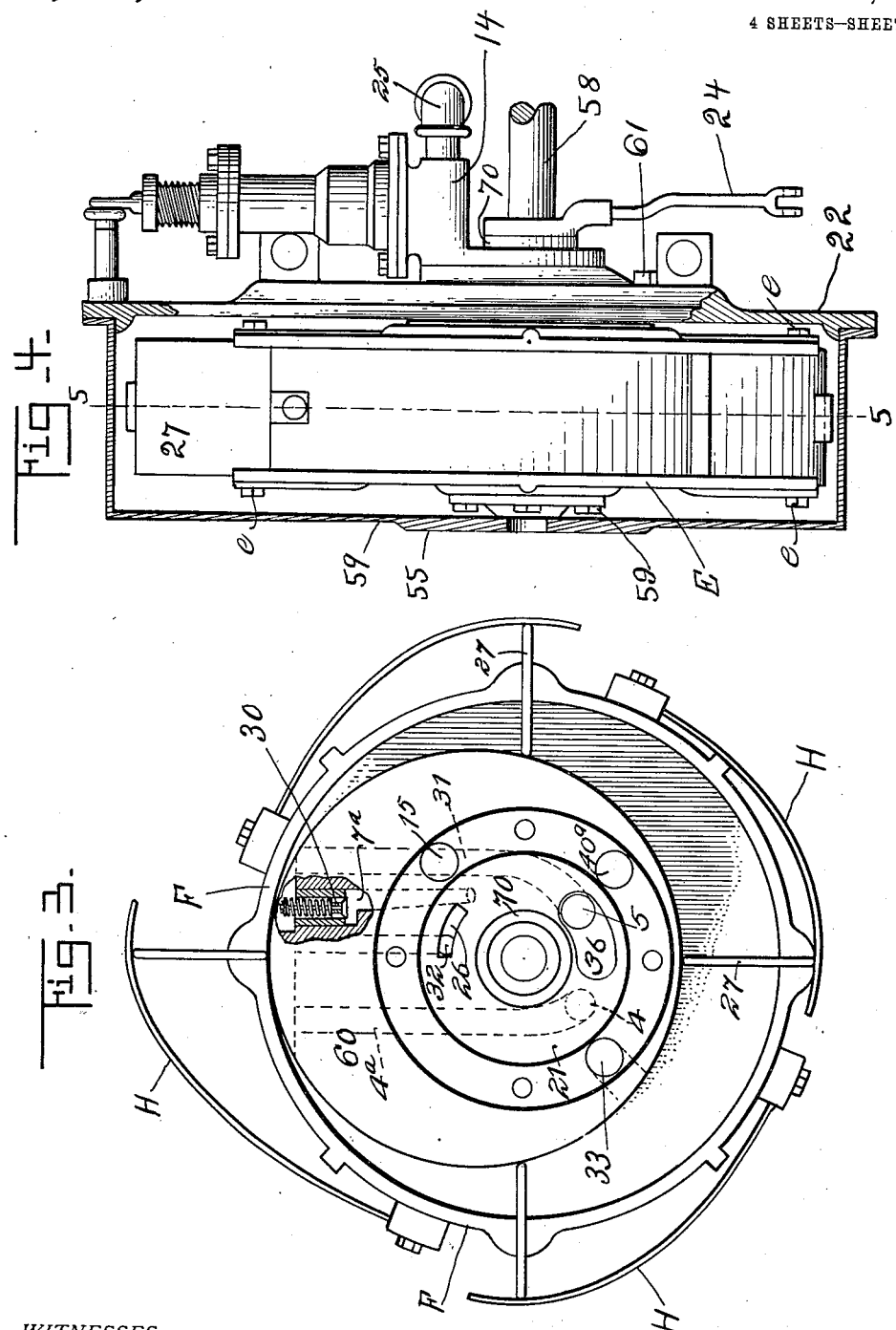

E. R. SLOAN.
CONVERTIBLE MOTOR AND PUMP.
APPLICATION FILED JAN. 13, 1913.
1,085,761.
Patented Feb. 3, 1914.
4 SHEETS—SHEET 4.
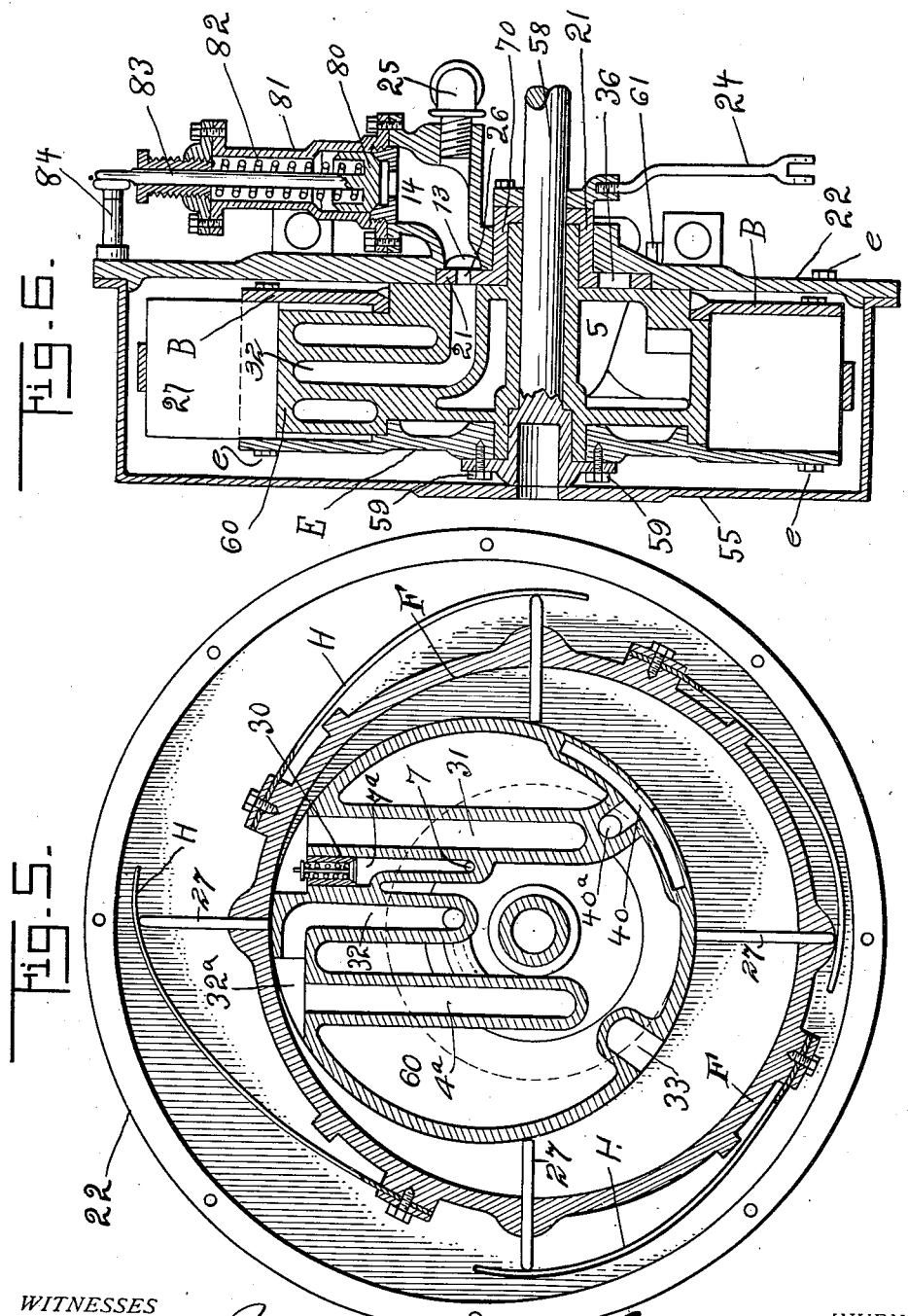

UNITED STATES PATENT OFFICE.

EDWARD RAYMOND SLOAN, OF DETROIT, MICHIGAN.

CONVERTIBLE MOTOR AND PUMP.

1,085,761.

Specification of Letters Patent. Patented Feb. 3, 1914.

Application filed January 13, 1913. Serial No. 741,707.

*To all whom it may concern:*

Be it known that I, EDWARD RAYMOND SLOAN, a citizen of the United States, residing at Detroit, in the county of Wayne and State of Michigan, have invented certain new and useful Improvements in Convertible Motors and Pumps, of which the following is a specification.

This invention is an apparatus particularly designed for use as a starter for gas engines used on motor vehicles, but is not limited thereto and is capable of other uses to which it may be applied.

The device embodies a convertible pump and motor which is operatively connected to the engine shaft. Compressed air or other fluid is employed, and when the device is used for starting purposes it acts as a motor and is operated by compressed air to turn the engine shaft. When converted into a pump or compressor, it is operated by the engine shaft, and acts to pump up pressure as desired, in the tank or reservoir. The conversion of the device from a motor to a pump or vice versa is effected by means of a suitable valve controlling a plurality of passages.

An embodiment of the invention is illustrated in the accompanying drawing—in which—

Figure 1 is a plan view of the running gear of a motor vehicle, showing the arrangement of the device as applied thereto. Fig. 2 is an elevation, partly in section, of the rear side of the motor or pump. Fig. 3 is an elevation of the device showing the interior parts, the back plate and other parts being removed. Fig. 4 is a side elevation. Fig. 5 is a vertical cross section on the line 5—5 of Fig. 4. Fig. 6 is a vertical longitudinal section on the line 6—6 of Fig. 2.

Referring specifically to the drawings, Fig. 1 shows the running gear of a motor vehicle on which is mounted in any suitable manner an air reservoir 50 connected by a pipe line 25, provided with a cut off valve 52, to the motor or compressor to be hereinafter described.

54 is a lever by means of which the operation of the starter is controlled. It is mechanically connected by suitable links and levers to an arm 24ᵃ on a rotary controlling valve. The illustration of the above parts will be accepted as largely diagrammatic, since the location and arrangement of the parts may be varied as desired.

The starter mechanism is inclosed in a casing or box 55 with a back plate 22 suitably mounted on the front end of the vehicle frame, as by cross rods 56 extending through perforated lugs 57 on the back plate. This box is located at the front end of the engine shaft 58 which projects into said casing and is bolted at its front end, as indicated at 59, to a circular plate E. A somewhat similar plate B is located at the opposite side, and a rim or cylinder F is bolted or held, as by bolts $e$, between these plates E and B. The cylinder or wall F is made in four sections, as shown particularly in Figs. 3 and 5, with slots between the sections for the pistons or blades 27 which work radially in said slots. The casing formed by the walls E and B and the rim F is circular, and is concentrically disposed with respect to the axis of the shaft 58, and it revolves with said shaft inside the outer casing 55. The pistons 27 are pressed at their outer ends by springs H against the periphery of a fixed inner eccentric drum 60, which is provided with passages to be hereinafter described.

The drum 60 is fastened to the back plate 22 by bolts 61 so that it is relatively immovable. At one point, the top, as shown, the periphery of the drum 60 is in contact with the inner surface of the rim F. The air pipe 25, from the tank 50, opens into a channel 14 formed on the back plate 22 and this communicates with a segmental channel or passage 13 on one side of a circular disk valve plate 21 which has a hollow hub 70 extending through the back plate, around the shaft 58, and connected to the operating arm 24, whereby the valve may be turned. The valve plate has a part 26 whereby the passage 13 may be opened to either of the passages 32 or 7 in the drum 60. The passage 32 extends to an outlet or opening 32ᵃ on one side of the point of contact between the drum and the casing F, and is used as an inlet when the device is operating as a motor. Then air pressure will flow from the pipe 25 through the passage 14, port 26, and passage 32 into the space between the drum and casing F, and by pressure against the blade or piston 27 will turn the casing F and thereby turn the engine shaft. The drum is also provided with a passage 33 which opens through an exhaust port 33ᵃ in the back plate 22, and when operating as a motor the air pressure exhausts through said passage 33 and port 33ª to the atmosphere. It will be noted that this port is located at such a distance around the drum from the point of contact with the casing F that the exhaust is not effected until after a succeeding piston has reached a position where it will receive the pressure entering through the passage 32. To let out any compression on the opposite side of the device, while it is acting as a motor as described, the drum has a passage 31 which terminates at a port 5 at the back of the drum, and said port is controlled by an opening 36 in the disk valve 21, said port 36 connecting the port 5 with an outlet or relief port 5ª extending through the back plate 22. Hence when the valve is set as shown in Fig. 3 the device will act as a motor, air pressure entering through the port 32 on one side of the chamber, and any compression on the other side of the chamber escaping through the passage 31, ports 5, 36 and 5ª.

To act as a compressor or pump, the valve 21 is turned until the opening 36 laps a port 4 communicating through a passage 4ª with the space on the left side of the chamber, and with a port 4ᵇ opening through the back plate 22. The same action closes the port 5, and also shifts the opening 26 from the passage 32 to a port 7 at the end of a passage 7ª which communicates through a check valve 30 with the right or compressor side of the chamber between the drum and the casing F, and the passage 32 is thereby cut off or closed. A breather passage 40 is also formed in the compressor side of the drum and communicates through a port 40ª with an opening or port 40ᵇ in the back plate 22 for the purpose of letting in or letting out the air from the compression chamber. When the device is acting as a motor the breather port 40 has no function except as an auxiliary exhaust port. When the device is acting as a compressor the breather port 40 performs the function of letting out a portion of the air gathered into the casing, before compression begins, in order to avoid too great compression. The breather passage is elongated so that the volume of air to be compressed can be varied by changing the location of the hole 40. Compression does not begin until the blade 27 passes the opening 40. Until that time, the air escapes through said opening. Consequently by varying the position of the opening 40 along the elongated passage the amount of air compressed is varied. The opening 40 is shown at or about the middle of the passage. If it were located at the upper end the amount of compression would be decreased; if at the lower end, the amount of compression would be increased, by later or earlier cutting off of the openings respectively by the blades 27. The hole 40 can be bored at any position along the passage. By thus shifting the valve the passage 7ª is thus connected through the ports 7 and 26 with the passages 13 and 14 and the air pipe 25, and when the outer cylinder is rotated by its connection to the crank shaft air is compressed on the right hand side of the drum, as shown in Figs. 3 and 5, and is forced through the valve 30 and the passages to the air pipe and reservoir where it is stored. Vacuum in the chambers behind the pistons 27 is prevented by air entering freely through ports 33 and 4ª. To prevent excessive pressure, the channel 14 is provided with an opening to a plunger 80, in a casing 81 attached to the back plate 22. This plunger is pressed closed by a spring 82, and has a rod 83 connected to one end of a lever 84, the other end of which presses on a rod 85 connected to a relief valve 86 which communicates with a port 15 which opens from the passage 31. When the pressure exceeds the strength of the spring 82 it lifts the plunger which through the lever 84 opens the valve 86, and then any pressure created in the chamber by the rotation of the cylinder escapes through the passage 31, port 15 and valve 86, the check valve 30 closing; and the pump thus runs idle. When it is again necessary to use the starter as a motor, the valve 21 is turned to original position and pressure is admitted to the left side of the chamber and drives the cylinder and shaft as above described.

What I claim is:

1. In a convertible rotary motor and pump, the combination of a shaft, a fixed eccentric drum provided with inlet and outlet passages, and exhaust passages, a rotary cylinder attached to the shaft and rotatable around said drum and in contact with the periphery thereof at one point, pistons carried by said cylinder and working in the chamber between the drum and cylinder, a pressure reservoir, a pipe connection thereto, and a valve controlling all of said passages and located between said drum and pipe and adapted to open either of said outlet and inlet passages and close the other.

2. In a convertible rotary motor and pump, the combination of a shaft, a cylinder fixed thereon, pistons carried by the cylinder, a fixed eccentric drum extending around the shaft and in contact at one point with the inner surface of the cylinder, springs tending to hold said pistons in contact with the drum, an air reservoir and a pipe connected thereto, said drum having a pressure inlet passage opening into the chamber between the cylinder and drum on one side of said point, and a pressure outlet passage opening from said chamber on the opposite side of the said point, suitable exhaust and air inlet passages in said drum, and a valve between said pressure inlet and outlet passages and the said pipe, adapted to open either one and close the other of said passages.

3. In a convertible rotary motor and pump, the combination of a shaft, a cylinder fixed thereon, a fixed eccentric drum located within the cylinder and in contact therewith at one point, pistons carried by the cylinder in yielding contact with the periphery of the drum, said drum having on one side an inlet pressure passage, an exhaust passage and a relief passage, and having on the opposite side an outlet pressure passage, an air inlet passage and a relief passage, all of said passages communicating with the space between the cylinder and drum, a reservoir, a pipe connected to the reservoir, and a valve located between said drum and pipe and having a port controlling said inlet and outlet pressure passages to the pipe, and also having a port controlling said relief passages.

4. The combination with a convertible rotary motor and pump, provided with a valved relief port, of a reservoir, a pipe connecting said motor and pump and reservoir, a valve controlling flow from the motor and pump to the reservoir and vice versa, and means actuated by the pressure in the pipe to operate the valve of the relief-port.

5. In a convertible motor and pump, the combination of a shaft, a cylinder rotating therewith, an eccentric fixed drum within the cylinder and in contact therewith at one point, said drum having an inlet pressure passage 32, an exhaust passage 33 and a relief passage 4 in one side thereof and also having the outlet pressure passage 7$^a$, the breather passage 40 and the relief passage 31 on the opposite side thereof, said passages 32, 4, 7$^a$ and 31 terminating in ports located around the shaft, the disk valve 21 extending around the shaft and having a port 26 coöperating with said passages 32 and 7$^a$ and another port 36 coöperating with said passages 4 and 31, a gas reservoir, and a pipe connected at one end thereto and terminating at the opposite end in a passage 13 leading to said port 36.

In testimony whereof, I affix my signature in presence of two witnesses.

EDWARD RAYMOND SLOAN.

Witnesses:
 HENRY E. ADELSPERGER,
 WILLIAM GUAN.